(12) United States Patent
Wetzig et al.

(10) Patent No.: US 9,810,600 B2
(45) Date of Patent: Nov. 7, 2017

(54) METHOD FOR DETECTING A LEAK ON A NON-RIGID TEST SPECIMEN

(71) Applicant: Inficon GMBH, Köln (DE)

(72) Inventors: Daniel Wetzig, Köln (DE); Silvio Decker, Köln (DE)

(73) Assignee: Infinicon GMBH, Köln (DE)

( * ) Notice: Subject to any disclaimer, the term of this patent is extended or adjusted under 35 U.S.C. 154(b) by 375 days.

(21) Appl. No.: 14/369,960

(22) PCT Filed: Dec. 28, 2012

(86) PCT No.: PCT/EP2012/077079
§ 371 (c)(1),
(2) Date: Jun. 30, 2014

(87) PCT Pub. No.: WO2013/102610
PCT Pub. Date: Jul. 11, 2013

(65) Prior Publication Data
US 2014/0326051 A1    Nov. 6, 2014

(30) Foreign Application Priority Data
Jan. 3, 2012   (DE) .................. 10 2012 200 063

(51) Int. Cl.
G01M 3/32 (2006.01)
G01M 3/36 (2006.01)
G01M 3/38 (2006.01)
G01M 3/40 (2006.01)

(52) U.S. Cl.
CPC ............ G01M 3/36 (2013.01); G01M 3/3218 (2013.01); G01M 3/3281 (2013.01); G01M 3/38 (2013.01); G01M 3/40 (2013.01)

(58) Field of Classification Search
CPC .................................. G01M 3/32; G01M 3/34
See application file for complete search history.

(56) References Cited

U.S. PATENT DOCUMENTS

| 3,813,923 A | 6/1974 | Pendleton |
| 4,862,732 A | 9/1989 | Raymond et al. |
| 4,899,574 A * | 2/1990 | Potteiger ............... G01M 3/366 73/49.3 |

(Continued)

FOREIGN PATENT DOCUMENTS

| AU | 11149/88 A | 8/1989 |
| CN | 1323391 A | 11/2001 |

(Continued)

OTHER PUBLICATIONS

Schaevitz, Finding the Right Sensor for Linear Displacement, Jul. 2004, (http://machinedesign.com/sensors/finding-right-sensor-linear-displacement).*

(Continued)

*Primary Examiner* — Erika J Villaluna
(74) *Attorney, Agent, or Firm* — Harris Beach PLLC

(57) ABSTRACT

The invention relates to a simplified method for detecting leaks on a non-rigid test specimen, comprising the steps of: introducing the test specimen into a film chamber, lowering the pressure in the film chamber outside of said test specimen, and detecting a leak in the test specimen on the basis of a spatial change in the film of said film chamber.

8 Claims, 1 Drawing Sheet

(56) References Cited

U.S. PATENT DOCUMENTS

| | | |
|---|---|---|
| 5,767,392 A | 6/1998 | Belcher et al. |
| 6,354,142 B1 | 3/2002 | Nothhelfer et al. |
| 6,732,571 B1 | 5/2004 | Flosbach |
| 6,955,076 B1 | 10/2005 | Widt et al. |
| 2004/0134259 A1 | 7/2004 | Haug et al. |
| 2008/0127716 A1 | 6/2008 | Eliasson |

FOREIGN PATENT DOCUMENTS

| | | | | |
|---|---|---|---|---|
| CN | 1447912 A | 10/2003 | | |
| DE | 3936163 A1 | 5/1991 | | |
| DE | 102006015254 A1 | 10/2007 | | |
| EP | 0152981 A1 | 8/1985 | | |
| EP | 355699 A2 | 2/1990 | | |
| NL | EP 0741288 A1 * | 11/1996 | .......... | G01M 3/3218 |

OTHER PUBLICATIONS

European Patent Office, International Search Report for Corresponding International Application No. PCT/EP2012/077079, dated May 13, 2013 (2 pgs).

* cited by examiner

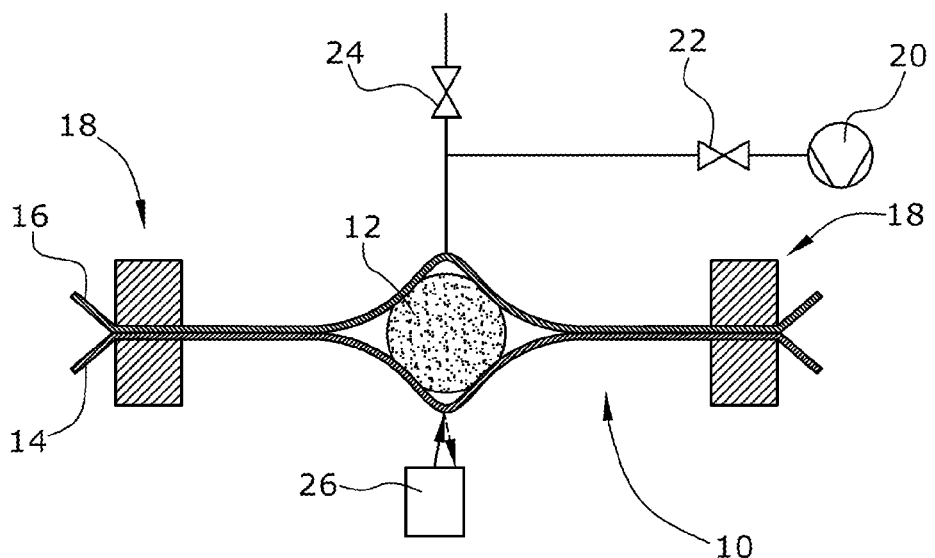

METHOD FOR DETECTING A LEAK ON A NON-RIGID TEST SPECIMEN

CROSS-REFERENCE TO RELATED APPLICATIONS

This application is a national stage application under 35 U.S.C. §371 of PCT Application No. PCT/EP2012/077079, filed Dec. 28, 2012, which claims priority to and the benefit of German Application No. 102012200063.1 filed on Jan. 3, 2012, which are incorporated herein by reference in their entirety.

The invention relates to a method for leak detection on a non-rigid test specimen.

Non-rigid test specimens have a flexible structure that yields with pressure changes. Such test specimens are food packages, for example. When the pressure differences are too great between the internal pressure of the test specimen and the ambient pressure of the same, there is a risk that the test specimen will burst or at least be damaged.

Conventionally, non-rigid test specimens are filled with a test gas and the test gas is measured in the exhaust gas flow of the pump system used to create the required pressure differences. As an alternative, the use of a specific test gas can be omitted if the sensor is adapted to the filling gas inside the test specimen. With this measuring method, the measuring result can be compromised by influences of the ambient gas.

U.S. Pat. No. 4,862,732 discloses the determination of the leakage rate of a leak on a pressurized flexible container by increasing the internal pressure of the container. This bears the risk of the test specimen bursting or being damaged if the pressure is too high.

U.S. Pat. No. 5,767,392 discloses the detection of a leak on a flexible container by compressing the container by means of a force exerted thereon from outside and by observing the behavior of the container wall after the removal of the external pressure. Again, with this method, the pressure that can be exerted is limited and the container may be damaged or burst if the pressure is too high.

U.S. Pat. No. 6,955,076 discloses the detection of a leak on a test specimen in a film chamber with the help of a test gas. It is described to improve the closability and the tightness of the film chamber by evacuating a volume in the edge zone of the film chamber, which volume is independent of the test chamber. Thereby, it is achieved that no gas from the environment of the film chamber gets into the test chamber volume through leaks in the closing region of the chamber to compromise the measuring result.

It is an object of the invention to provide a simplified method for leak detection on a non-rigid test specimen.

The method of the present invention is defined in claim 1.

First, the rigid test specimen is inserted into a film chamber in a closed state. A film chamber is a test chamber with flexible wall portions changing their form in dependence on the difference between the pressure inside the film chamber and the ambient pressure. After the test specimen has been inserted into the film chamber, the film chamber is closed and the pressure inside the film chamber is reduced in the area outside the test specimen. In the process, the flexible walls of the film chamber cling to the test specimen. The film of the film chamber contacts the test chamber from the outside. Then, the detection of a leak is performed by observing the film of the film chamber, wherein a spatial change of the film clinging to the test specimen is interpreted as an indication of a leak. The film, which clings to the test specimen when the pressure inside the film chamber is lowered, supports the non-rigid test specimen from the outside and prevents a bursting of the test specimen.

It is a particular advantage of the method according to the invention that in a measurement of the positional change of the film or of a volume change of the film chamber, no particular requirements must be made with regard to the tightness of the film chamber. Whereas, in the conventional methods for measuring a pressure increase within the film chamber or for a tightness test using test gas in the film chamber, the tightness of the film chamber has a significant influence on the measuring result, the tightness of the film chamber is of negligible importance for the present method. Merely, such a tightness of the film chamber should be achieved as allows the desired lowering of the pressure in the film chamber. Lowering the pressure in a leaky film chamber can also be achieved by using a pump with a correspondingly higher suction capacity. In particular, it is sufficient to merely achieve such a tightness of the film chamber that is equal to or inferior to the tightness of the test specimen under test. The leakage rate of the film chamber may be as high or at least twice as high as the leakage rate of the test specimen.

The measurement of the spatial change may be performed using a laser-optical measurement of the position of the film surface, e.g. by a variation of the deflection of a laser directed onto the film surface. In case of a metalized film surface, the measurement can be performed by measuring the capacitance change. As an alternative, one may also use a device that indicates a contact or the absence of a contact with the film surface. For example, a contact pin or a contact gauge can mechanically detect the positional change in the film surface.

According to the invention, it is preferred that not only the detection of a leak is performed, but that also the leakage rate of the gas escaping through the leak is determined. Here, the leakage rate is calculated in dependence on the measured spatial change of the film. In this regard, the principle is applied according to which the change in film position is the larger, the larger the leak is.

Preferably, in executing the method of the present invention, the pressure in the film chamber is reduced to a pressure that is lower by at least 500 mbar and preferably by at least 950 mbar than the pressure in the test specimen. As a consequence, this results in a pressure difference of at least 500 mbar and preferably at least 950 mbar between the film chamber pressure outside the test specimen and the internal pressure of the test specimen. Pressure differences that great can be generated without destroying or damaging the test specimen by making the film of the film chamber cling to the test specimen and support the same.

When the pressure in the film chamber is lowered, the atmospheric pressure in the test specimen can be maintained.

An embodiment of the invention will be detailed hereunder with reference to the FIGURE:

The FIGURE shows a measuring arrangement for the implementation of the present method.

The measuring arrangement is formed by a film chamber 10 into which a non-rigid test specimen 12 in the form of a food package has been placed. After the test specimen 12 has been positioned in the film chamber 10, the film chamber is closed by laying the two films 14, 16 forming the film chamber one upon the other, with the test specimen 12 between them, and by pressing the films against each other in an airtight manner at their edge zones by means of a clamping device 18.

Thereafter, the film chamber is evacuated by means of the vacuum pump 20 connected with the inside of the film chamber via a valve 22. Here, the valve 22 is opened and a ventilation valve 24, which is also connected with the inside of the film chamber 10, is closed to atmosphere. While atmospheric pressure still prevails in the test specimen 12, the pressure in the volume inside the film chamber, which surrounds the test specimen 12, is lowered by at least 1000 mbar. After the pressure in the film chamber has been lowered, the valve 22 is also closed and the pump 20 is deactivated.

The distance sensor 26 is used to monitor the position of the film 14 by means of laser-optical measurement of the distance between the distance sensor 26 and the film of the film chamber 10. A change in the spatial position of the film 14 is detected as a reduced distance from the distance sensor 26 and is used as a leak indicator.

A leakage rate of $10^{-2}$ mbar·l/s, for instance, causes a volume change of $10^{-2}$ cm³/s in a package volume of 1 liter with a gas filling at 1000 mbar. For a cube-shaped package volume of 1 liter (cross-sectional area 100 cm²) this means a reduction in thickness of 1 µm/s. Relative distance change rates of 1 µm/s can be detected in particular with optical methods. The change in package volume is transferred to the film surface of the film test chamber.

The present method is independent of the type of gas in the test specimen and in the film chamber. Leaks on the film chamber have but a negligible influence on the test method. Coarse leaks are detected quickly, due to very prominent and fast positional changes in the film surface. Only few valves are required, such as for pump connection and ventilation purposes.

The invention claimed is:

1. A method for detecting leaks on a non-rigid test specimen, comprising the steps of:

introducing the test specimen into a film chamber, lowering the pressure in the film chamber outside of said test specimen, and detecting a leak in the test specimen on the basis of a spatial change in a film of said film chamber; and wherein the pressure in the film chamber is reduced to a pressure that is lower than the pressure in the test specimen by at least 500 mbar and preferably by at least 950 mbar.

2. The method of claim 1, wherein, after the introduction of the test specimen, the closed film chamber shows a leakage rate during detection that is at least as high or at least twice as high as a leakage rate of the test specimen.

3. The method of claim 1, wherein the spatial change in the film is measured by laser-optical measurement of a position of the film surface.

4. The method of claim 3, wherein the laser-optical measurement is performed by measuring the change in deflection of a laser directed onto the film surface.

5. The method of claim 1, wherein the spatial change in the film is detected by measuring the capacitance change of a metalized film surface.

6. The method of claim 1, wherein the spatial change in the film is detected by means of a device that indicates contact or the absence of contact with the film surface.

7. The method of claim 1, wherein the leakage rate of a gas escaping through the leak in the test specimen is calculated in dependence on the measured spatial change in the film.

8. The method of claim 1, wherein the reduction of the pressure in the film chamber is performed while maintaining the atmospheric pressure in the test specimen.

\* \* \* \* \*